United States Patent
Stewart (10) Patent No.: US 11,102,993 B2
(45) Date of Patent: Aug. 31, 2021

(54) PET FOOD

(71) Applicant: MARS, INCORPORATED, McLean, VA (US)

(72) Inventor: Douglas Stewart, Orrville, OH (US)

(73) Assignee: Mars, Incorporated, McLean, VA (US)

(*) Notice: Subject to any disclaimer, the term of this patent is extended or adjusted under 35 U.S.C. 154(b) by 0 days.

(21) Appl. No.: 16/078,527

(22) PCT Filed: Feb. 23, 2017

(86) PCT No.: PCT/US2017/018992
§ 371 (c)(1),
(2) Date: Aug. 21, 2018

(87) PCT Pub. No.: WO2017/147216
PCT Pub. Date: Aug. 31, 2017

(65) Prior Publication Data
US 2019/0045814 A1     Feb. 14, 2019

Related U.S. Application Data (60) Provisional application No. 62/298,458, filed on Feb. 22, 2016.

(51) Int. Cl.
*A23K 40/25*     (2016.01)
*A23K 10/20*     (2016.01)
(Continued)

(52) U.S. Cl.
CPC .............. *A23K 40/25* (2016.05); *A23K 10/20* (2016.05); *A23K 20/147* (2016.05);
(Continued)

(58) Field of Classification Search
CPC ...... A23K 20/147; A23K 40/25; A23K 50/45; A23K 20/158; A23K 10/20; A23K 50/42; A23K 20/163
See application file for complete search history.

(56) References Cited

U.S. PATENT DOCUMENTS 3,851,084 A    11/1974  Rossen et al.
4,029,823 A *  6/1977   Bone ....................... A23J 3/227
                                                              426/249

(Continued)

FOREIGN PATENT DOCUMENTS

JP    H07184621 A    7/1995
JP    H09169 A       1/1997
(Continued)

*Primary Examiner* — Subbalakshmi Prakash
(74) *Attorney, Agent, or Firm* — Mars, Incorporated (57) ABSTRACT

The present disclosure relates to coextruded pet food compositions and/or to methods for producing the same. The disclosure provides, for example, a method for producing a pet food, comprising: (i) extruding a first composition from a first extruder through a die at a first rate of exit from the die; and (ii) extruding a second composition from a second extruder through the die at a second rate of exit from the die, wherein the first rate of exit from the die is higher than the second rate of exit from the die, to produce a coextruded pet food that comprises about 30% to about 50%, by weight, of the first composition and about 50% to about 70%, by weight, of the second composition. Moreover, the coextruded pet food compositions of the present disclosure may include, for example, at least about 3% cheese and/or at least about 5% bacon.

19 Claims, 4 Drawing Sheets

(51) Int. Cl.
*A23K 20/147* (2016.01)
*A23K 20/158* (2016.01)
*A23K 20/163* (2016.01)
*A23K 50/45* (2016.01)
*A23K 50/42* (2016.01)

(52) U.S. Cl.
CPC .......... *A23K 20/158* (2016.05); *A23K 20/163* (2016.05); *A23K 50/42* (2016.05); *A23K 50/45* (2016.05)

(56) References Cited

U.S. PATENT DOCUMENTS

| | | |
|---|---|---|
| 4,900,572 A | 2/1990 | Repholz |
| 5,045,339 A | 9/1991 | Ducharme |
| 6,132,786 A | 10/2000 | Poulos et al. |
| 6,572,910 B2 | 6/2003 | Groves et al. |
| 2003/0228400 A1 | 12/2003 | Dahl et al. |
| 2014/0186276 A1 | 7/2014 | Mahe |
| 2014/0186278 A1 | 7/2014 | Franke et al. |
| 2014/0228400 A2 | 8/2014 | Yang et al. |
| 2015/0086679 A1 | 3/2015 | Seguin |

FOREIGN PATENT DOCUMENTS

| | | |
|---|---|---|
| JP | 2002534993 A | 10/2002 |
| JP | 2003164262 A | 6/2003 |
| JP | 2006223308 A | 8/2006 |
| JP | 2008029339 A | 2/2008 |
| JP | 2009159856 A | 7/2009 |
| JP | 2009540839 A | 11/2009 |
| JP | 2011523850 A | 8/2011 |
| JP | 2012157314 A | 8/2012 |
| JP | 2013544073 T2 | 12/2013 |
| JP | 2016508029 A | 3/2016 |
| RU | 2234840 C2 | 8/2004 |
| WO | 2015186038 A1 | 12/2015 |

* cited by examiner

PET FOOD

CROSS-REFERENCE TO RELATED APPLICATIONS

This application is a national stage application, filed under 35 U.S.C. § 371, of International Application No. PCT/US2017/018992, filed Feb. 23, 2017, which claims priority to U.S. Patent Application Ser. No. 62/298,458, filed on Feb. 22, 2016, the entire contents of each hereby being incorporated by reference herein for any and all purposes.

TECHNICAL FIELD

The present disclosure relates generally to pet food compositions, more specifically to coextruded pet food compositions and/or coextruded pet food products, such as compositions and/or products for feeding to dogs, and to methods for making the same.

BACKGROUND

The present disclosure relates generally to pet food compositions, more specifically to coextruded pet food compositions and/or coextruded pet food products, such as compositions and/or products for feeding to dogs, and to methods for making the same.

High-meat content foods and treats for pets are desired by many pet owners. In devising new pet foods, a variety of different factors must be considered, including any difficulties of making or selling high-meat content foods, such as lack of shelf stability, lack of formability and/or lack of affordability.

Further, a key attribute of high-meat content treats is that they must be highly palatable to pets to ensure that they are accepted immediately and consumers, that is, the pet owner, are not disappointed. Consumers looking for high-meat content pet foods and/or treats may consider semi-moist pet foods to be suitable. However, many semi-moist pet foods do not contain a high amount of meat.

BRIEF SUMMARY

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of features.

The present disclosure provides semi-moist pet food products, such as treat products for dogs. In some embodiments, the present disclosure provides a pet food product comprising bacon and having at least about 3% cheese by weight. In certain embodiments of a pet food product according to the present disclosure, bacon is the first ingredient (i.e. a bacon-first product), meaning that the product comprises more bacon, by weight, than any other ingredient.

Further, in some embodiments, the pet food product of the present disclosure comprises a strip portion and a stripe portion, wherein the strip portion and the stripe portion are coextruded. And in certain embodiments, the present disclosure provides a bacon-first product, comprising at least about 3% cheese by weight, at least about 12% crude protein, at least about 8% crude fat, at least about 4% crude fiber, and a maximum moisture content of about 27%. In some embodiments, the pet food of the present disclosure comprises between about 8% and about 15% fat. In other embodiments, the pet food of present disclosure comprises between about 8.5% and about 11% fat. In still other embodiments, the pet food of the present disclosure may comprise between about 6% and about 15% fat.

In some embodiments, the present disclosure provides a pet food product comprising one or more of: bacon, wheat flour, corn flour, soy grits, water, glycerin, sugar, dried cheese, salt, calcium carbonate, smoke flavor, phosphoric acid, BHA, citric acid, sorbic acid, calcium propionate (and/or other preservative(s)), lecithin, titanium dioxide and color(s). In some embodiments, the pet food product comprises 5-20% bacon. In some embodiments, the pet food product comprises 10-20% bacon. In some embodiments, the pet food product comprises 10-25% wheat flour. In some embodiments, the pet food product comprises at least about 10% glycerin. In some embodiments, the pet food product comprises at least about 10% and/or at least about 15% bacon.

In some embodiments, a pet food product of the present disclosure, such as a dog treat, comprises at least about 65 kcal Metabolizable Energy (ME) per product. In some embodiments, a pet food product of the present disclosure comprises at least about 2950 kcal ME per kg.

Further, the present disclosure provides a method for producing a pet food, comprising: (i) extruding a first composition from a first extruder through a die at a first rate of exit from the die; and (ii) extruding a second composition from a second extruder through the die at a second rate of exit from the die, wherein the first rate of exit from the die is higher than the second rate of exit from the die, to produce a coextruded pet food that comprises about 30% to about 50%, by weight, of the first composition and about 50% to about 70%, by weight, of the second composition.

In some embodiments, the coextruded pet food may comprise: (i) about 12% to about 20%, by weight, of protein; (ii) an amount of starch, wherein the starch may have a level of gelatinization that is greater than 75%, or, in certain embodiments, the starch may have a level of gelatinization that is greater than 80%; (iii) about 8% to about 15%, by weight, of fat; (iv) an amount of cheese, wherein the amount of cheese may be at least about 3%, by weight, in some embodiments; and/or (v) an amount of bacon, wherein the coextruded pet food may comprise 5-20% bacon, by weight, in some embodiments.

Moreover, in some embodiments, a coextruded pet food of the present disclosure has a water activity of about 0.7 to about 0.85. And in certain embodiments, a coextruded pet food of the present disclosure may have a pH of about 4.5 to about 6.5.

And in some embodiments, the present disclosure provides a pet food, comprising: about 30% to about 50%, by weight, of a first composition, wherein the first composition comprises at least about 3% cheese; and about 50% to about 70%, by weight, of a second composition, wherein the second composition comprises at least about 5% bacon, wherein the pet food comprises about 8 to about 15%, by weight, of at least one fat and about 12 to about 20%, by weight, of at least one protein, wherein the pet food comprises an amount of starch, and wherein the pet food has a first surface and a second surface, and wherein each of the first surface and the second surface is an undulated surface.

Further, in some embodiments, a pet food of the present disclosure is a coextruded, high-meat pet food, which includes at least 5% bacon, by weight, it has a moisture content of between about 19 and about 25%, it includes at least about 3% cheese, by weight, and it has a total fat content of 6-15% by weight.

DETAILED DESCRIPTION

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

The presently-disclosed subject matter is illustrated by specific but non-limiting examples throughout this description. The examples may include compilations of data that are representative of data gathered at various times during the course of development and experimentation related to the present invention(s). Each example is provided by way of explanation of the present disclosure and is not a limitation thereon. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

All references to singular characteristics or limitations of the present disclosure shall include the corresponding plural characteristic(s) or limitation(s) and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

While the following terms used herein are believed to be well understood by one of ordinary skill in the art, definitions are set forth to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims. Thus, for example, reference to "an amino acid" may include a plurality of such amino acids, and so forth.

Unless otherwise indicated, all numbers expressing quantities, properties, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±50%, in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

In some embodiments, a pet food of the present disclosure is a semi-moist pet food, wherein a semi-moist pet food is a pet food that has a moisture content of about 15 to 30%. For purposes of the present disclosure, a dry food has a low moisture content of 12% or less on average, and a wet pet food has a high moisture content of, for example, 80% or more on average. In some embodiments, a pet food of the present disclosure has a moisture content of about 18% to about 25%. In other embodiments, the pet food of the present disclosure has a moisture content of about 20% to about 22%.

The terms "component" and "portion" are used interchangeably throughout the present disclosure to mean a part or portion.

As used herein, "pet food" means a composition intended for oral consumption to meet one or more nutritional needs of a pet. Pet food expressly excludes items which are capable of being orally ingested but are not intended to be ingested, such as rocks. The terms "pet food" and "pet food product" are used interchangeably throughout this disclosure.

As used herein, "dietary composition" refers to any composition utilized as part of the diet for a dog. This includes, but is not limited to, a pet food, a treat, a chew, a biscuit, a gravy, a supplement, a topper, and any combination thereof.

As used herein, "nutritionally balanced" and/or "nutritionally complete" refers to a composition capable of sustaining life as the sole dietary ration for an animal, without the need for any other substance, except possibly water.

As used herein, the terms "animal" or "pet" mean a domestic animal including, but not limited to, domestic dogs, cats, horses, cows, ferrets, rabbits, pigs, and the like. Domestic dogs and cats are particular examples of pets. "Dog" includes adults, between 1 year of age and 7 years of age; seniors, older than 7 years of age; and super-seniors, older than 11 years of age. For the purpose of this disclosure, "dog" does not include puppies under the age of 1 year.

The terms "cheese" and "real cheese" are used interchangeably in the present disclosure. Further, "cheese" includes "pet food cheese". In some embodiments, a pet food cheese according to the present disclosure is a dried cheese. In certain embodiments, a pet food cheese according to the present disclosure is a dried cheese that is produced by spray drying cheese, such as by spray drying cheese trimmings and/or shredded cheese.

All lists of items, such as, for example, lists of ingredients, are intended to and should be interpreted as Markush groups. Thus, all lists can be read and interpreted as items "selected from the group consisting of" . . . list of items . . . "and combinations and mixtures thereof."

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All percentages in the present disclosure are listed as percent by weight on the total weight of the material or mixture, unless explicitly noted otherwise.

In some embodiments, the present disclosure provides a food product, such as a pet food, for a companion animal, wherein the pet food comprises bacon. In some embodiments, the pet food includes bacon as a first ingredient, meaning that the pet food includes more bacon (% wt/wt) than any other ingredient.

Indeed, in some embodiments, the pet food may comprise one or more of the following ingredients: bacon, soy grits, corn flour, wheat flour, water, glycerin, sugar, cheese, salt, calcium carbonate, smoke flavor, phosphoric acid, antioxidants, sorbic acid, citric acid, butylated hyrdoxyanisole (BHA), calcium proprionate, lecithin, titanium dioxide, colors and any combination thereof.

In some embodiments, the extruded pet food product is not twisted before or after extrusion.

In some embodiments, a pet food according to the present disclosure comprises a first component/portion/composition, such as a strip portion, and a second component/portion/composition, such as a stripe portion. Together the first and second compositions make up a pet food product according to the present disclosure. In some embodiments, a pet food product according to the present disclosure comprises at least one strip portion and at least one stripe portion.

In some embodiments, a pet food product according to the present disclosure comprises about 60% by weight of one or more strip portions and about 40% by weight of one or more stripe portions. In some embodiments, a pet food product according to the present disclosure comprises about between about 40% and about 80% by weight of one or more strip portions and between about 20% and about 60% by weight of one or more stripe portions. In some embodiments, a pet food product of the present disclosure comprises about 70% to about 80% by weight of one or more strip portions and between about 20% and about 30% by weight of one or more stripe portions. In some embodiments, a pet food product according to the present disclosure comprises between about 70% and about 75% by weight of one or more strip portions and between about 25% and about 30% by weight of one or more stripe portions. In some embodiments, a pet food product according to the present disclosure comprises between about 60% and about 75% by weight of one or more strip portions and between about 25% and about 40% by weight of one or more stripe portions. Such a combination of one or more strip portions and one or more stripe portions may result in a pet food product, such as those provided in Examples 1-4, below.

Figure 1:
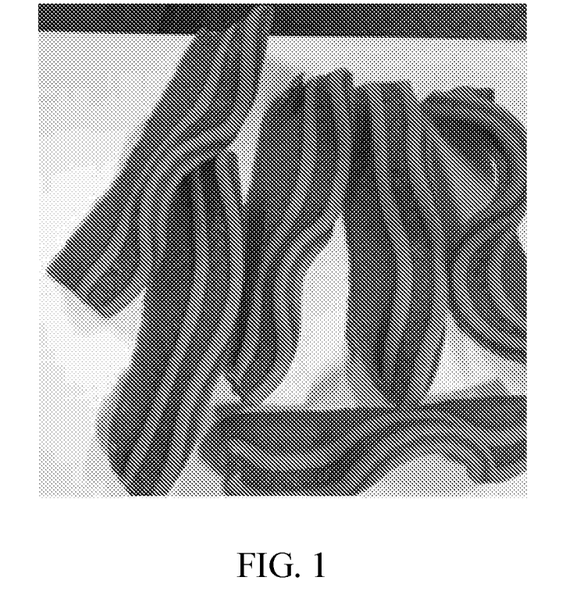
FIG. 1 shows exemplary pet food products of the present disclosure, specifically those having the formulation provided in Table 8.

Turning now to the figures, FIG. 1 shows an embodiment of a pet food product according to the present disclosure.

In some embodiments, one or more strip portions and one or more stripe portions are coextruded to produce a pet food product, which is a composite of the one or more strip portions and the one or more stripe portions.

Further, in some embodiments, the strip portion(s) or the stripe portion(s) may be extruded at different rates or speeds. For example, the strip portion may be extruded at a slower rate than the stripe portion. When one of the portions of the pet food product is extruded at a slower speed than another portion of the pet food product, the inventors of the present disclosure have found that a rippling and/or waving effect occurs in the final product, as shown, for example, in FIGS. 1-6.

Additionally, the strip portion may be extruded from a first extruder at a first rate, and the stripe portion may be extruded from a second extruder at a second rate. And the strip portion, which is extruded by the first extruder at the first rate, may be coextruded together with the stripe portion, which is extruded by the second extruder at the second rate. In some embodiments, the strip portion and stripe portion are coextruded through a single die plate. And in some embodiments, the stripe portion is extruded at a faster rate through the die plate than is the strip portion. In other embodiments, the strip portion may be extruded at a faster rate through the die plate than the stripe portion. In any embodiment of the present disclosure, the strip portion and the stripe portion may be coextruded.

The strip portion may have a top surface and a bottom surface. And, in some embodiments, the stripe portion is extruded onto one or more of the surfaces of the strip portion.

Figure 7:
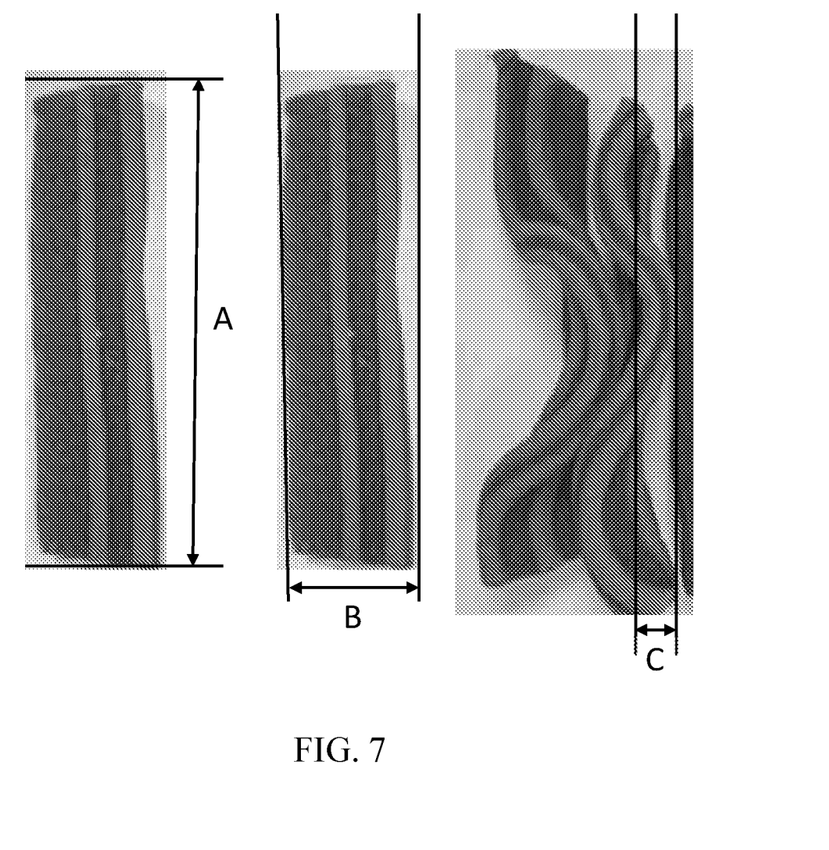
FIG. 7 shows various exemplary pet food products of the present disclosure, wherein A shows a length of a pet food product according to the present disclosure, B shows a width of a pet food product according to the present disclosure, and C shows a thickness of a pet food product according to the present disclosure.

A pet food product of the present disclosure has a length, a width and a thickness. The length of a pet food product of the present disclosure is the major dimension of the pet food product. The width of a pet food product is a minor dimension of the pet food product. The width is substantially less than the length, and the thickness is less than the width and, thus, less than the length. Referring now to FIG. 7, A shows a length of a pet food product according to the present disclosure, B shows a width of a pet food product according to the present disclosure, and C shows a thickness of a pet food product according to the present disclosure.

In some embodiments, a pet food product of the present disclosure has a length of between about 90 and about 140 mm. In certain embodiments, a pet food product of the present disclosure has a length of between about 94 and about 130 mm. In a particular embodiment, the pet food product has a length of between about 100 and about 120 mm. In some embodiments, the length of a pet food according to the present disclosure is at least about 94 mm and less than about 130 mm.

In some embodiments, a pet food product of the present disclosure has a width of between about 20 and about 40 mm. In certain embodiments, a pet food product of the present disclosure has a width of between about 25 and about 35 mm. In a particular embodiment, the pet food product has a width of between about 27 and about 33 mm. In some embodiments, the width of a pet food according to the present disclosure is at least about 26 mm and less than about 34 mm.

In some embodiments, a pet food product of the present disclosure, which includes the strip portion and the stripe portion, has a thickness of between about 5 and about 10 mm. In certain embodiments, a pet food product of the present disclosure has a thickness of between about 7.5 and about 9.5 mm. In a particular embodiment, the pet food product has a thickness of between about 8 and about 9 mm.

Further, each of the strip portion and the stripe portion of a pet food product of the present disclosure has a length, a width and a thickness, wherein the length is the major dimension, the width is substantially less than the length, and the thickness is less than the width and, thus, less than the length.

In some embodiments, a pet food product of the present disclosure has a stripe portion with a width of between about 3 and about 6 mm. In certain embodiments, a pet food product of the present disclosure has a stripe portion with a width of between about 3.5 and about 5.6 mm. In a particular embodiment, the pet food product has a stripe portion with a width of between about 4 and about 5 mm.

In some embodiments, a pet food product of the present disclosure has a weight of between about 15 and about 35 grams. In some embodiments, a pet food product of the present disclosure has a weight of between about 17 and about 27 grams. In some embodiments, a pet food product of the present disclosure has a weight of between about 20 and about 24 grams.

In some embodiments, a pet food product of the present disclosure is a semi-moist pet food. In some embodiments, the present disclosure provides a pet food product comprising bacon and having at least about 3% cheese by weight. In certain embodiments of a pet food product according to the present disclosure, bacon is the first ingredient (i.e. a bacon-first product), meaning that the product comprises more bacon, by weight, than any other ingredient.

Further, in some embodiments, the pet food product of the present disclosure comprises a strip portion and a stripe portion, wherein the strip portion and the stripe portion are coextruded. And in certain embodiments, the present disclosure provides a bacon-first product, comprising at least about 3% cheese by weight, at least about 12% crude protein, at least about 8% crude fat, at least about 4% crude fiber, and a maximum moisture content of about 27%. In some embodiments, the pet food of the present disclosure comprises between about 8% and about 15% fat. In other embodiments, the pet food of present disclosure comprises between about 8.5% and about 11% fat. In still other embodiments, the pet food of the present disclosure may comprise between about 6% and about 15% fat.

In some embodiments, the present disclosure provides a pet food product comprising one or more of: bacon, wheat flour, corn flour, soy grits, water, glycerin, sugar, dried cheese, salt, calcium carbonate, smoke flavor, phosphoric acid, BHA, citric acid, sorbic acid, calcium propionate (and/or other preservative(s)), lecithin, titanium dioxide and color(s). In some embodiments, the pet food product comprises 5-20% bacon. In some embodiments, the pet food product comprises 10-20% bacon. In some embodiments, the pet food product comprises 10-25% wheat flour. In some embodiments, the pet food product comprises at least about 10% glycerin. In some embodiments, the pet food product comprises at least about 10% and/or at least about 15% bacon.

In some embodiments, a pet food product of the present disclosure, such as a dog treat, comprises at least about 65 kcal Metabolizable Energy (ME) per product. In some embodiments, a pet food product of the present disclosure comprises at least about 2950 kcal ME per kg.

Further, the present disclosure provides a method for producing a pet food, comprising: (i) extruding a first composition from a first extruder through a die at a first rate of exit from the die; and (ii) extruding a second composition from a second extruder through the die at a second rate of exit from the die, wherein the first rate of exit from the die is higher than the second rate of exit from the die, to produce a coextruded pet food that comprises about 30% to about 50%, by weight, of the first composition and about 50% to about 70%, by weight, of the second composition.

In certain embodiments, the first composition may be the stripe portion of the present disclosure and the second composition may be the strip portion of the present disclosure.

In some embodiments, the first composition may be the strip portion of the present disclosure and the second composition may be the stripe portion of the present disclosure.

A rate of exit from the extruder may be measured, for example, in kg/hr.

The die may comprise any shape, as known in the art, wherein the die comprises one or more holes that allow an extrudate material to pass through the die.

The first composition is coextruded through one or more holes of the die with the second composition in some embodiments. Moreover, in some embodiments, the first composition is extruded through a first hole in the die and the second composition is extruded through a second hole in the die, and after exiting the first hole, the first composition contacts the second composition.

In some embodiments, the coextruded pet food may comprise: (i) about 12% to about 20%, by weight, of protein; (ii) an amount of starch, wherein the starch may have a level of gelatinization that is greater than 75%, or, in certain embodiments, the starch may have a level of gelatinization that is greater than 80%; (iii) about 8% to about 15%, by weight, of fat; (iv) an amount of cheese, wherein the amount of cheese may be at least about 3%, by weight, in some embodiments; and/or (v) an amount of bacon, wherein the coextruded pet food may comprise 5-20% bacon, by weight, in some embodiments.

In some embodiments, the pet food of the present disclosure comprises an amount of starch, wherein the amount of starch has, on average a level of gelatinization that is greater than 75%. In other embodiments, the pet food of the present disclosure has an amount of starch with an average level of gelatinization that is greater than 80%. And in some embodiments, the starch of the coextruded pet food of the present disclosure has an average level of gelatinization that is between about 75 and about 90%.

Moreover, in some embodiments, a coextruded pet food of the present disclosure has a water activity of about 0.7 to about 0.85. In some embodiments, the pet food has a water activity of about 0.75 to about 0.83.

And in certain embodiments, a coextruded pet food of the present disclosure may have a pH of about 4.5 to about 6.5. In some embodiments, the pH of the coextruded pet food product of the present disclosure is about 5 to about 5.8.

In some embodiments, the present disclosure provides a pet food, comprising: about 30% to about 50%, by weight, of a first composition, such as a stripe portion, wherein the first composition comprises at least about 3% cheese; and about 50% to about 70%, by weight, of a second composition, such as a strip portion, wherein the second composition comprises at least about 5% bacon, wherein the pet food comprises about 8 to about 15%, by weight, of at least one fat and about 12 to about 20%, by weight, of at least one protein, wherein the pet food comprises an amount of starch, and wherein the pet food has a first surface and a second surface, and wherein each of the first surface and the second surface is an undulated surface.

Figure 5:
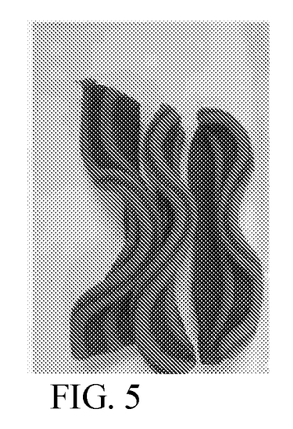
FIG. 5 shows exemplary pet food products of the present disclosure, specifically those having the formulation provided in Table 16 and having a ratio of about 35% stripe portion to about 65% strip portion.
Figure 6:
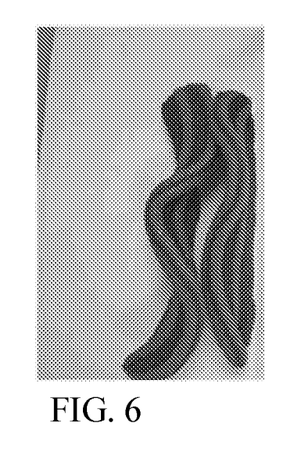
FIG. 6 shows exemplary pet food products of the present disclosure, specifically those having the formulation provided in Table 17 and having a ratio of about 45% stripe portion to about 55% strip portion.

A product having an undulated surface, as described herein, has a wave-like shape. The wave-like, undulated shape is visible, for example, along the length of the product in some embodiments. FIGS. 5 and 6 provide images of pet food products having an undulated shape according to the present disclosure.

The inventors of the present disclosure have discovered that by coextruding a first composition at a first rate and a second composition at a second rate that is different from the first rate, the coextruded product that is produced by the first and second compositions will have an undulated surface.

Example 1

The following (Table 1) is an example formulation of a pet food of the present disclosure. The amount of each item is provided on a % by weight basis, as measured prior to any cooking and/or extrusion.

TABLE 1

| Ingredient Name | % by weight |
| --- | --- |
| Bacon Slurry | 15.5 |
| Soy Grits | 15.4 |
| Corn Flour | 15.4 |
| Wheat Flour | 15.4 |
| Water | 13 |
| Glycerin | 11.1 |
| Sugar | 5.84 |
| Cheese | 3.15 |
| Salt | 1.15 |
| Calcium Carbonate | 1.15 |
| Natural Smoke Flavor | 1.04 |
| Phosphoric Acid | 0.855 |
| BHA & Citric Acid | 0.409 |
| Sorbic Acid | 0.351 |
| Calcium Propionate | 0.234 |
| Lecithin | 0.0292 |
| Titanium Dioxide | 0.0151 |
| Color 1 | 0.0474 |
| Color 2 | 0.03 |

Example 2

The following (Table 2) is an example formulation of a pet food according to the present disclosure. The amount of each item is provided on a % by weight basis, as measured prior to any cooking and/or extrusion.

TABLE 2

| Ingredient Name | % by weight |
| --- | --- |
| Bacon Slurry | 16.1 |
| Soy Grits | 15.6 |
| Corn Flour | 15.6 |
| Wheat Flour | 15.6 |
| Water | 13.5 |
| Glycerin | 11.4 |
| Sugar | 6.68 |
| Salt | 1.71 |
| Calcium Carbonate | 1.13 |
| Natural Smoke Flavor | 1.06 |
| Phosphoric Acid | 0.583 |
| BHA & Citric Acid | 0.401 |
| Sorbic Acid | 0.339 |
| Calcium Propionate | 0.255 |
| Lecithin | 0.0048 |
| Titanium Dioxide | 0.0115 |
| Color 1 | 0.0456 |
| Caramel Color | 0.00675 |

Example 3

The following (Table 3) is an example formulation of a pet food according to the present disclosure. The amount of each item is provided on a % by weight basis, as measured prior to any cooking and/or extrusion.

TABLE 3

| Ingredient Name | % by weight |
| --- | --- |
| Bacon Slurry | 16.1 |
| Soy Grits | 15.6 |
| Corn Flour | 15.6 |
| Wheat Flour | 15.6 |
| Water | 13.5 |
| Glycerin | 11.4 |
| Sugar | 6.68 |
| Salt | 1.71 |
| Calcium Carbonate | 1.13 |
| Natural Smoke Flavor | 1.06 |
| Phosphoric Acid | 0.583 |
| BHA & Citric Acid | 0.401 |
| Sorbic Acid | 0.339 |
| Calcium Propionate | 0.255 |
| Caramel Color | 0.00675 |
| Red Color | 0.0456 |
| Lecithin | 0.0048 |
| Titanium Dioxide | 0.0115 |

Example 4

The following (Table 4) is an example formulation of a pet food according to the present disclosure. The amount of each item is provided on a % by weight basis, as measured prior to any cooking and/or extrusion.

TABLE 4

| Ingredient Name | % by weight |
| --- | --- |
| Bacon Slurry | 15.5 |
| Soy Grits | 15.4 |
| Corn Flour | 15.4 |
| Wheat Flour | 15.4 |
| Water | 13 |
| Glycerin | 11.1 |

TABLE 4-continued

| Ingredient Name | % by weight |
|---|---|
| Sugar | 5.84 |
| Cheese | 3.15 |
| Salt | 1.15 |
| Calcium Carbonate | 1.15 |
| Natural Smoke Flavor | 1.04 |
| Phosphoric Acid | 0.855 |
| BHA & Citric Acid | 0.409 |
| Sorbic Acid | 0.351 |
| Calcium Propionate | 0.234 |
| Orange Color | 0.0474 |
| Red Color | 0.03 |
| Lecithin | 0.0292 |
| Titanium Dioxide | 0.0151 |

Example 5

The following (Table 5) is an example formulation for a raw mixture for a strip portion (i.e. a strip raw mixture) of a pet food according to the present disclosure. The amount of each item is provided on a % by weight basis, as measured prior to any cooking and/or extrusion.

TABLE 5

| Ingredient Name | % by weight |
|---|---|
| Corn Flour | 26.3 |
| Calcium Carbonate | 1.975 |
| Wheat Flour | 26.3 |
| Salt | 1.975 |
| Sugar | 10 |
| Sorbic Acid | 0.6 |
| Soy Grits | 26.3 |
| Calcium Propionate | 0.4 |
| Antioxidants | 0.7 |
| Soy Lecithin | 0.05 |
| Pet Food Cheese | 5.4 |

Example 6

The following (Table 6) is an example formulation for a raw mixture for a stripe portion (i.e. a stripe raw mixture) of a pet food according to the present disclosure. The amount of each item is provided on a % by weight basis, as measured prior to any cooking and/or extrusion.

TABLE 6

| Ingredient Name | % by weight |
|---|---|
| Corn Flour | 26.3 |
| Calcium Carbonate | 1.945 |
| Wheat Flour | 26.3 |
| Salt | 1.945 |
| Sugar | 10 |
| Sorbic Acid | 0.6 |
| Soy Grits | 26.3 |
| Calcium Propionate | 0.4 |
| Antioxidant(s) | 0.7 |
| Soy Lecithin | 0.05 |
| Pet Food Cheese | 5.4 |
| Titanium Dioxide | 0.065 |

Example 7

The following (Table 7) is an example formulation for a slurry, such as a bacon slurry, according to the present disclosure. In some embodiments, steam and/or heat may be applied to cook a slurry of the present disclosure. In certain embodiments, the slurry is an emulsified bacon slurry. The amount of each item is provided on a % by weight basis, as measured prior to any cooking and/or extrusion.

TABLE 7

| Ingredient Name | % by weight |
|---|---|
| Phosphoric Acid | 3 |
| Glycerine | 39 |
| Bacon | 54.35 |
| Smoke Flavor | 3.65 |

Example 8

The following (Table 8) is an example formulation of a pet food according to the present disclosure. The amount of each item is provided on a % by weight basis, as measured prior to any cooking and/or extrusion.

TABLE 8

| Ingredient Name | % by weight |
|---|---|
| Bacon Slurry | 16.1 |
| Wheat Flour | 15.5 |
| Soy Grits | 15.5 |
| Water | 11.1 |
| Glycerin | 11.3 |
| Sugar | 6.65 |
| Corn Flour | 15.5 |
| Antioxidant(s) | 0.399 |
| Salt | 1.7 |
| Smoke Flavor | 1.02 |
| Phosphoric Acid | 0.58 |
| Calcium Carbonate | 1.12 |
| Sorbic Acid | 0.337 |
| Calcium Propionate | 0.254 |
| Color 1 | 2.92 |
| Titanium Dioxide | 0.0113 |
| Color 2 | 0.0117 |

Figure 2:
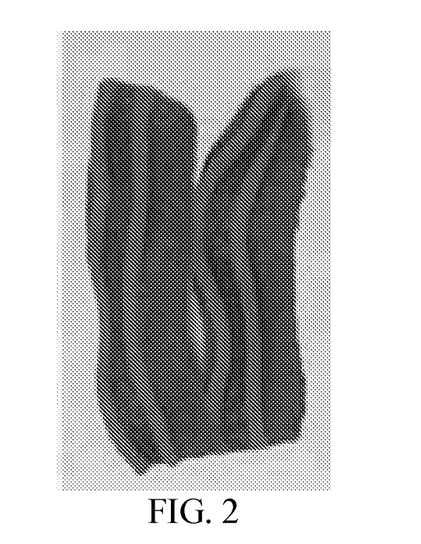
FIG. 2 shows exemplary pet food products of the present disclosure, specifically those having the formulation provided in Table 8.

FIG. 1 shows exemplary pet food products having the formulation provided in Table 8. Likewise, FIG. 2 shows exemplary pet food products having the formulation provided in Table 8.

Example 9

The following (Table 9) is an example formulation for a strip portion of a pet food according to the present disclosure. The amount of each item is provided on a % by weight basis, as measured prior to any cooking and/or extrusion.

TABLE 9

| Ingredient | % by weight |
|---|---|
| Water | 10 |
| Bacon Slurry | 28.5 |
| Color(s) | 2.8 |
| Strip Raw Mixture | 58.7 |

Example 10

The following (Table 10) is an example formulation for a stripe portion of a pet food according to the present disclosure. The amount of each item is provided on a % by weight basis, as measured prior to any cooking and/or extrusion.

TABLE 10

| Ingredient | % by weight |
| --- | --- |
| Water | 8.5 |
| Bacon Slurry | 28.5 |
| Color(s) | 5 |
| Stripe Raw Mixture | 58 |

In some embodiments, a pet food product according to the present disclosure comprises between about 50% and about 70% of a strip portion, such as the strip portion provided in Example 9, and between about 30% and about 50% of a stripe portion, such as the stripe portion provided in Example 10.

Example 11

The following (Table 11) is another example formulation for a raw mixture for a strip portion (i.e. a strip raw mixture) of a pet food according to the present disclosure. The amount of each item is provided on a % by weight basis, as measured prior to any cooking and/or extrusion.

TABLE 11

| Ingredient Name | % by weight |
| --- | --- |
| Corn Flour | 27.2 |
| Calcium Carbonate | 1.955 |
| Wheat Flour | 27.2 |
| Salt | 3 |
| Sugar | 11.7 |
| Sorbic Acid | 0.595 |
| Soy Grits | 27.2 |
| Calcium Propionate | 0.45 |
| Antioxidant(s) | 0.7 |

Example 12

The following (Table 12) is another example formulation for a strip portion of a pet food according to the present disclosure. The amount of each item is provided on a % by weight basis, as measured prior to any cooking and/or extrusion.

TABLE 12

| Ingredient | % by weight |
| --- | --- |
| Water | 10.5 |
| Bacon Slurry | 29 |
| Color(s) | 3.5 |
| Strip Raw Mixture | 57 |

Example 13

The following (Table 13) is another example formulation for a raw mixture for a stripe portion (i.e. a stripe raw mixture) of a pet food according to the present disclosure. The amount of each item is provided on a % by weight basis, as measured prior to any cooking and/or extrusion.

TABLE 13

| Ingredient Name | % by weight |
| --- | --- |
| Corn Flour | 27.225 |
| Calcium Carbonate | 2 |
| Wheat Flour | 27.225 |
| Salt | 2.941 |
| Sugar | 11.563 |
| Sorbic Acid | 0.582 |
| Soy Grits | 27.225 |
| Calcium Propionate | 0.435 |
| Antioxidant(s) | 0.7 |
| Soy Lecithin | 0.031 |
| Titanium Dioxide | 0.074 |

Example 14

The following (Table 14) is another example formulation for a stripe portion of a pet food according to the present disclosure. The amount of each item is provided on a % by weight basis, as measured prior to any cooking and/or extrusion.

TABLE 14

| Ingredient Name | % by weight |
| --- | --- |
| Water | 12.475 |
| Bacon Slurry | 29.5 |
| Color(s) | 0.025 |
| Stripe Raw Mixture | 58 |

Example 15

The following (Table 15) is another example formulation for a slurry, such as a bacon slurry, according to the present disclosure. In some embodiments, the slurry is an emulsified bacon slurry. The amount of each item is provided on a % by weight basis, as measured prior to any cooking and/or extrusion.

TABLE 15

| Ingredient Name | % by weight |
| --- | --- |
| Phosphoric Acid | 2 |
| Glycerine | 39 |
| Bacon | 55.35 |
| Smoke Flavor(s) | 3.65 |

In some embodiments, a pet food product according to the present disclosure comprises between about 65% and about 80% of a strip portion, such as the strip portion provided in Example 12, and between about 20% and about 35% of a stripe portion, such as the stripe portion provided in Example 14.

Example 16

The following (Table 16) is an example formulation of a pet food according to the present disclosure. The amount of each item is provided on a % by weight basis, as measured prior to any cooking and/or extrusion.

TABLE 16

| Ingredient Name | % by weight |
| --- | --- |
| Bacon Slurry | 15.8 |
| Wheat Flour | 15.7 |

TABLE 16-continued

| Ingredient Name | % by weight |
| --- | --- |
| Soy Grits | 15.7 |
| Water | 11.1 |
| Glycerin | 11.1 |
| Sugar | 6.65 |
| Corn Flour | 15.7 |
| Antioxidant(s) | 0.406 |
| Salt | 1.24 |
| Smoke Flavor | 1.02 |
| Phosphoric Acid | 0.58 |
| Calcium Carbonate | 1.24 |
| Sorbic Acid | 0.348 |
| Calcium Propionate | 0.232 |
| Color 1 | 2.92 |
| Titanium Dioxide | 0.0151 |
| Color 2 | 0.0117 |
| Lecithin | 0.029 |
| Pet Food Cheese | 1.02 |

Figure 3:
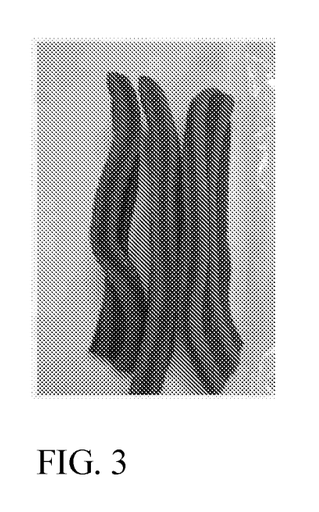
FIG. 3 shows exemplary pet food products of the present disclosure, specifically those having the formulation provided in Table 16 and having a ratio of about 27% stripe portion to about 73% strip portion.

FIG. 3 shows exemplary pet food products of the present disclosure, specifically those having the formulation provided in Table 16 and having a ratio of about 27% stripe portion to about 73% strip portion.

Figure 4:
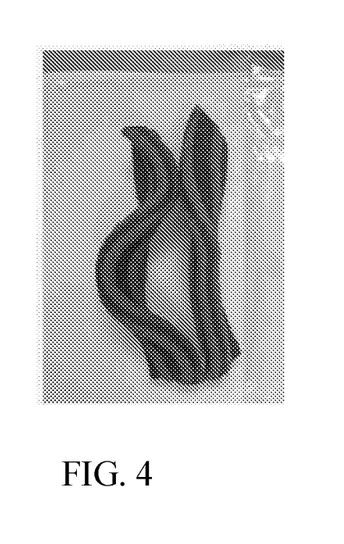
FIG. 4 shows exemplary pet food products of the present disclosure, specifically those having the formulation provided in Table 16 and having a ratio of about 30% stripe portion to about 70% strip portion.

FIG. 4 shows exemplary pet food products of the present disclosure, specifically those having the formulation provided in Table 16 and having a ratio of about 30% stripe portion to about 70% strip portion.

FIG. 5 shows exemplary pet food products of the present disclosure, specifically those having the formulation provided in Table 16 and having a ratio of about 35% stripe portion to about 65% strip portion.

Example 17

The following (Table 17) is an example formulation of a pet food according to the present disclosure. The amount of each item is provided on a % by weight basis, as measured prior to any cooking and/or extrusion.

TABLE 17

| Ingredient Name | % by weight |
| --- | --- |
| Bacon Slurry | 15.8 |
| Wheat Flour | 15.2 |
| Soy Grits | 15.2 |
| Corn Flour | 15.2 |
| Glycerin | 11.1 |
| Water | 10.9 |
| Sugar | 5.51 |
| Color | 2.6 |
| Salt | 1.17 |
| Calcium Carbonate | 1.17 |
| Natural Smoke Flavor | 1.04 |
| Pet Food Cheese | 3.63 |
| Phosphoric Acid | 0.57 |
| Antioxidant(s) | 0.406 |
| Sorbic Acid | 0.348 |
| Calcium Propionate | 0.232 |
| Lecithin | 0.029 |
| Color | 0.0151 |
| Titanium Dioxide | 0.0132 |

FIG. 6 shows exemplary pet food products of the present disclosure, specifically those having the formulation provided in Table 17 and having a ratio of about 45% stripe portion to about 55% strip portion.

In some embodiments, a pet food of the present disclosure is designed to be 100% nutritionally complete and balanced for animal nutrition.

In some embodiments, a pet food of the present disclosure may also contain at least one fat, flavor enhancers, preservatives, nutrients, and/or colorants. As used herein fat includes edible oils and preferably will be liquid fat at room temperature. Exemplary fats include corn oil, soybean oil, peanut oil, cottonseed oil, grapeseed oil, sunflower oil, flaxseed oil (and other sources of omega-3 and omega-6 fatty acids), vegetable oil, palm kernel oil, olive oil, tallow, lard, shortening, butter and combinations thereof. In a preferred embodiment, the fat is vegetable oil. If the fat is present, it will generally be in a range of about 1 to about 20%, preferably about 1.5 to about 10% and more preferably about 2 to about 5% by weight of the pet chew composition. Flavors are well known. For example, the use of flavor oils such as rosemary oil, eucalyptus oil and clove oil may be employed. Nutrients include, but are not limited to vitamins, minerals, and functional ingredients. Other ingredients may also be included in the composition, for example, release agents, stabilizers, and emulsifiers.

Preferably, the pet food of the present disclosure demonstrates flexibility and elastic properties to improve chewing enjoyment and lasting time. The product is designed to break down under repetitive chewing. The texture of the pet food ensures proper balance between animal safety, oral care efficacy, enjoyment and lasting time.

In some embodiments, the pet food of the present disclosure can be formulated using one or more of the following ingredients: gelatin, wheat protein isolate, glycerin, pea protein, water, potato protein, sodium caseinate, natural poultry flavor, lecithin, minerals (dicalcium phosphate, potassium chloride, magnesium amino acid chelate, calcium carbonate, zinc sulfate, ferrous sulfate, copper sulfate, manganese sulfate, potassium iodide), vitamins (dl-alpha tocopherol acetate [source of vitamin E], L-ascorbyl-2-polyphosphate [source of vitamin C], vitamin B12 supplement, d-calcium pantothenate [Vit B5], niacin supplement, vitamin A supplement, riboflavin supplement, vitamin D3 supplement, biotin, pyridoxine hydrochloride [vitamin B6], thiamine mononitrate [vitamin B1], folic acid), dried tomato, apple pomace, vegetable oil (preserved with mixed tocopherols), ground flaxseed, dried sweet potato, cranberry fiber, dried cultured skim milk, choline chloride, taurine, decaffeinated green tea extract, carotene, turmeric, and anthocyanins. In certain embodiments, the pet food is a natural pet food.

In some embodiments, a pet food of the present disclosure can include, but is not limited to, protein materials, starch materials, fiber materials, fat materials, mineral materials, vitamin materials, and mixtures and combinations thereof. Protein materials can include, but are not limited to, chicken meal, chicken, chicken by-product meal, lamb, lamb meal, turkey, turkey meal, beef, beef by-product, viscera, fish meal, entrails, and mixtures and combinations thereof. Starch materials can include, but are not limited to, cereals, grains, corn, wheat, rice, oats, corn grits, sorghum, grain sorghum, wheat bran, oat bran, amaranth, durum wheat, and mixtures and combinations thereof. Fiber materials can include, but are not limited to, fructooligiosaccharides, beet pulp, mannanoligosaccharides, oat fiber, citrus pulp, carboxymethylcellulose, gums such as gum Arabic guar gum and carrageen, apple and tomato pomaces, citrus fiber, fiber extracts, fiber derivatives, dried beet fiber, distillers dried grain solids, and mixtures and combinations thereof. Fat materials include, but are not limited to, poultry fat, chicken fat, turkey fat, pork fat, lard, tallow, beef fat, vegetable oils, corn oil, soy oil, cotton pellet oil, rape pellet oil, fish oil, menhaden oil, anchovy oil, palm oil, palm kernel oil, coconut oil, and mixtures and combinations thereof, and partially or fully hydrogenated versions of any of the aforementioned oils. Mineral materials can include, but are not limited to, sodium selenite, monosodium phosphate, calcium carbonate, potassium chloride, ferrous sulfate, zinc oxide, manganese sulfate, copper sulfate, manganese oxide, potassium iodide, cobalt carbonate, and mixtures and combinations thereof. Vitamin materials can include, but are not limited to, choline chloride, vitamin E supplement, ascorbic acid, vitamin A acetate, calcium pantothenate, pantothenic acid, biotin, thiamine mononitrate, vitamin B12 supplement, niacin, riboflavin supplement, inositol, pyridoxine hydrochloride, vitamin D3 supplement, folic acid, vitamin C, and mixtures and combinations thereof.

In one embodiment, a pet food of the present disclosure can comprise additional components including, but not limited to, beef broth, brewers dried yeast, egg, egg product, flax meal, amino acids such as methionine, leucine, lysine, tryptophan, arginine, cysteine, aspartic acid, taurine, and mixtures and combinations thereof.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any disclosure disclosed or claimed herein or that it alone, or in any combination with any other reference or references, teaches, suggests or discloses any such disclosure. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure. Furthermore, the foregoing description is for the purpose of illustration only, and not for the purpose of limitation.

One of ordinary skill in the art will recognize that additional embodiments or implementations are possible without departing from the teachings of the present disclosure or the scope of the claims which follow. This detailed description, and particularly the specific details of the exemplary embodiments and implementations disclosed herein, is given primarily for clarity of understanding, and no unnecessary limitations are to be understood therefrom, for modifications will become obvious to those skilled in the art upon reading this disclosure and may be made without departing from the spirit or scope of the claimed invention(s).

What is claimed is:

1. A method for producing a coextruded pet food, comprising:

extruding a first composition from a first extruder through a first hole in a die at a first speed from the first hole in the die to form a first portion; and extruding a second composition from a second extruder through a second hole in the die at a second speed from the second hole in the die to form a second portion that extends along a length of the first portion, wherein the first speed from the die is higher than the second speed from the die, wherein the first composition contacts the second composition after exiting the respective holes in the die, and wherein the coextruded pet food comprises a moisture content of from about 15 to 30%, by weight, about 30% to about 50%, by weight, of the first composition, and about 50% to about 70%, by weight, of the second composition.

2. The method of claim 1, wherein the coextruded pet food comprises about 12% to about 20%, by weight, of protein.

3. The method of claim 1, wherein the coextruded pet food comprises an amount of starch.

4. The method of claim 3, wherein the amount of starch has a level of gelatinization that is greater than 75%.

5. The method of claim 3, wherein the amount of starch has a level of gelatinization that is greater than 80%.

6. The method of claim 1, wherein the coextruded pet food comprises about 8% to about 15%, by weight, of fat.

7. The method of claim 1, wherein the coextruded pet food has a water activity of about 0.7 to about 0.85.

8. The method of claim 1, wherein the coextruded pet food has a pH of about 4.5 to about 6.5.

9. The method of claim 1, wherein the first composition and the second composition are coextruded through the die to form the coextruded pet food, wherein the coextruded pet food has a top surface and a bottom surface, and wherein at least one surface of the coextruded pet food then contacts a moving surface.

10. The method of claim 9, wherein at least a portion of the moving surface is moving away from the die.

11. The method of claim 1, wherein the die is rotating.

12. The method of claim 1, wherein the die is static.

13. The method of claim 1, wherein the moving surface comprises a belt.

14. The method of claim 1, wherein the first composition comprises an amount of cheese.

15. The method of claim 14, wherein the coextruded pet food comprises at least about 3% cheese.

16. The method of claim 1, wherein the second composition comprises an amount of bacon.

17. The method of claim 16, wherein the coextruded pet food comprises 5-20% bacon.

18. The method of claim 16, wherein the coextruded pet food comprises 10-20% bacon.

19. The method of claim 16, wherein the coextruded pet food comprises at least about 3% cheese and at least about 5% bacon.

* * * * *